May 9, 1961 G. EMBER ET AL 2,983,354
TOKEN AND SYSTEM FOR USING SAME
Filed Sept. 11, 1956 2 Sheets-Sheet 1

INVENTORS:
GEORGE EMBER
HAROLD F. JACOBSON
BY
Curtis, Morris & Safford
ATTORNEYS.

INVENTORS:
GEORGE EMBER
HAROLD F. JACOBSON
BY
Curtis, Morris & Safford
ATTORNEYS.

United States Patent Office 2,983,354
Patented May 9, 1961

2,983,354

TOKEN AND SYSTEM FOR USING SAME

George Ember, Goldens Bridge, N.Y., and Harold F. Jacobson, 253 E. 77th St., New York, N.Y.

Filed Sept. 11, 1956, Ser. No. 609,241
4 Claims. (Cl. 194—4)

This invention relates to a token for use in selectively operating a machine, for example a vending machine, and it relates to a system suitable for use in such a machine to determine whether a given token is acceptable and if so to initiate an operation of some kind, for example, the release of merchandise.

An object of the invention is to provide a token which is impossible, or at least extremely difficult and costly, to counterfeit.

Another object is to provide such a token which has the physical appearance of an ordinary coin, which is simple and safe to use, and which is inexpensive to manufacture.

A further object is to provide a simple and reliable system which can readily identify a token of the above kind and determine whether it is acceptable, i.e. genuine.

These and other objects will in part be pointed out in and in part be understood from the following description.

Illustrative of the utility of the present invention is the need for a coin vending machine able to dispense, without inconvenience in payment, goods or services costing more than a dollar. In the past, since no vending machine has yet been commercially developed which can accept paper currency, identify its denomination and test its genuiness, and then deliver the correct change along with the merchandise, the operation of such a machine has involved the customer's inserting in it a pocketful of coins. Though there have been attempts to develop such a machine which could be operated by a single token worth more than a dollar, the problem of how to detect counterfeit tokens has remained a major stumbling block. Many schemes have been proposed, running from the use of specially prepared tokens to the use of very elaborate token testing devices, but none of these seems to have been practical. The present invention seeks to overcome these difficulties by providing an inexpensive token of ordinary form or appearance, which, however, cannot easily be copied by unauthorized persons. The invention also provides a system for identifying such a token with a minimum of complicated apparatus.

In accordance with the present invention a token having the size and shape of an ordinary coin, for example, is treated to make it radioactive in a predetermined pattern, which pattern, without other knowledge, is practically impossible to duplicate from an analysis of the token itself. A system for accepting such a token, or for rejecting it if not genuine, is also provided. This system in one simple embodiment includes a radiation detecting device set to test a particular pattern and intensity of radiation. Any token not passing this test is rejected.

A better understanding of the invention together with a fuller appreciation of its many advantages will best be gained from a study of the following description given in connection with the accompanying drawings in which.

Figures 1, 2, 3, 4:
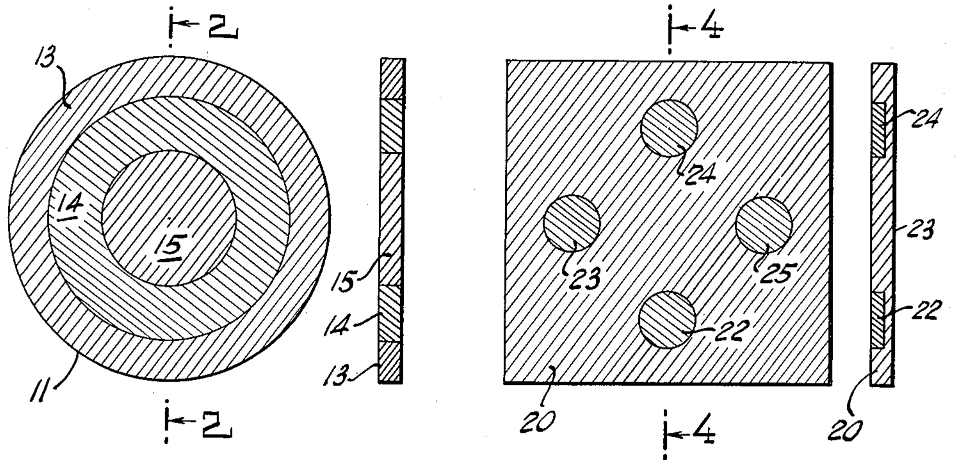
Figure 1 is a plan view of a token embodying features of the invention.
Figure 2 is a section view taken as indicated by lines 2—2 in Figure 1.
Figure 3 is a plan view of another token embodying features of the invention.
Figure 4 is a section view taken as indicated by lines 4—4 in Figure 3.

Referring to Figures 1 and 2, token 11 shown herein is divided into the three annular zones 13, 14 and 15. Each zone is made of a different radioactive material fabricated in any suitable way as by plating, welding, laminating, or by irradiation. Zone 13 may for example, contain a mixture of thorium 232, and cobalt 60; zone 14, chromium 51 and iron 55; and zone 15, strontium 83 and molybdenum 93. Alternatively, each may contain a single radioactive material. The resulting composite token will then have a distinctive pattern and intensity of radiation which, moreover, will be constantly changing according to the respective decay rates of the various radioactive materials. It is therefore apparent that not only is it difficult to identify the components contributing to the overall radioactivity of the token, one component masking the activity of another in constantly changing degrees, but it is well nigh impossible to duplicate a given token within the limits imposed by the system to be described without complete beforehand knowledge of how the token was made. This knowledge evidently is not obtainable from a mere study of the token itself but would have to be derived by tedious analysis using complex and very expensive apparatus. Therefore counterfeiting would be costly and financially unrewarding and hence impractical.

Figures 3 and 4 show a token 20 also embodying features of the invention. Here instead of being round, the body of the token is square and has a number of circular areas 22, 23, 24 and 25 containing radioactive material as before. These areas can for example be formed by surface diffusion into the body of the token of suitable radioactive materials in predetermined amounts at previously determined places.

In connection with token 11 and token 20 it should be understood that the total amount of radioactivity required is very small being of the order of that used in the luminous dial of a watch. Since token 11 is round and completely symmetrical, no special means to orient its pattern of radiation during testing is required. With token 20, on the other hand, its square shape inherently provides a certain degree of orientation and to take advantage of this area 22—25 can be positioned symmetrically with respect to the edges of the token.

Figures 5, 6:
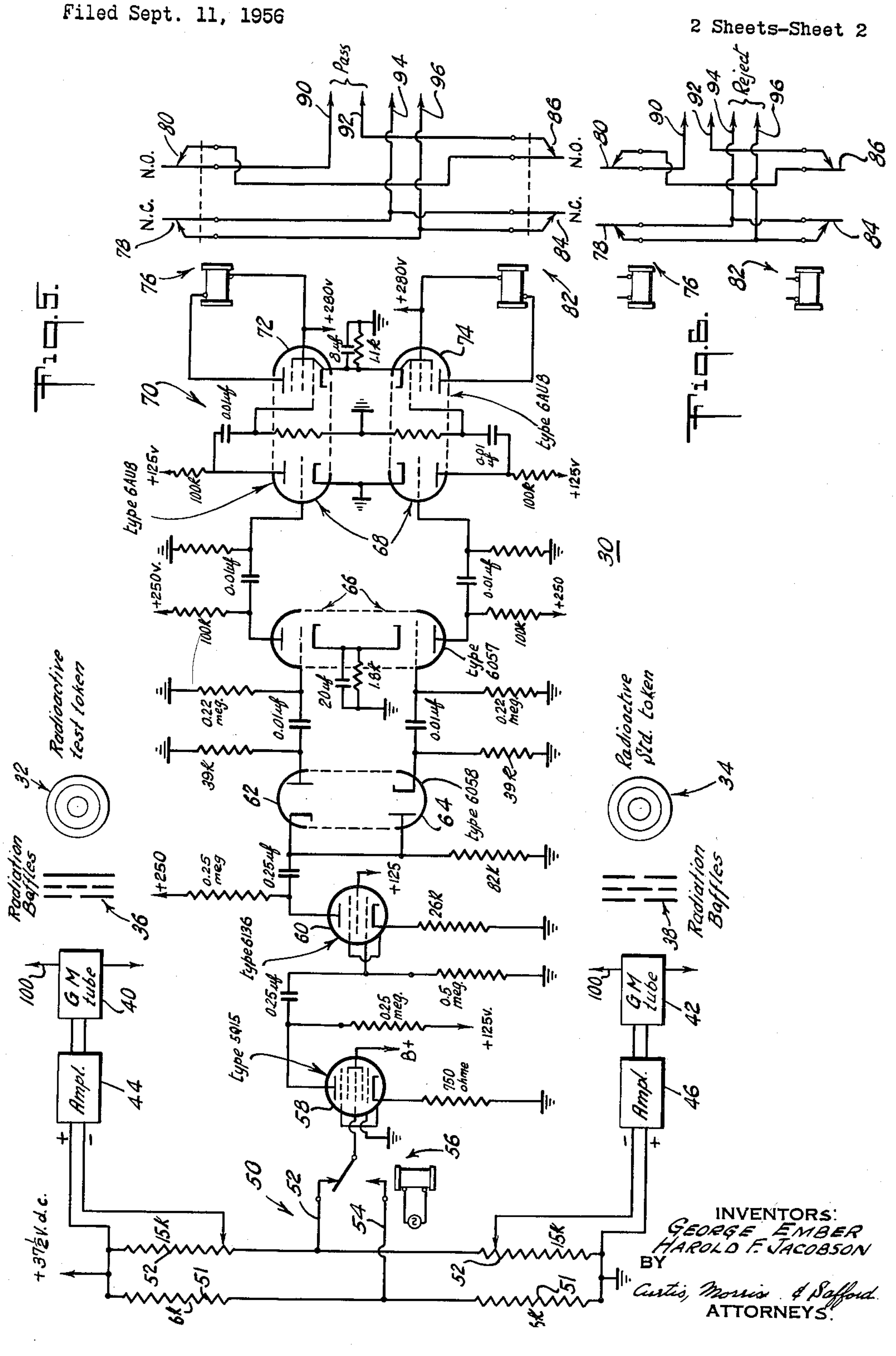
Figure 5 is an illustrative diagram of a vending machine token testing circuit embodying features of the invention.
Figure 6 shows a portion of the circuit of Figure 5 in condition to reject a token under test.

Referring to Figure 5, the circuit 30 shown herein and embodying features of the invention is adapted to compare a customer's token, generally indicated at 32 and similar, for example, to token 11, with a standard or known token generally indicated at 34. If the radiations from these tokens match within given limits, the customer's token will be accepted and merchandise and the like will be dispensed by the machine along with the proper change, if any. Otherwise, the customer's token will be rejected.

Each of tokens 32, 34 is held by means not shown in front of the respective baffles 36, 38 which are identical and are adapted to screen the various zones of radiation of the two tokens in the same degree. Each baffle may consist of three separate layers of radiation absorbing material, one layer corresponding to each zone of the token and constructed for example so that the radiation of that zone is permitted to pass while portions of the radiation from other zones are not with the result that the net radiation finally passing through the baffle has a uniform pattern. Alternatively, for a token like token 11, the baffles can be made of annular rings lying in the same plane. Baffles 36, 38 should be matched and can be changed at will. Thus the net radiation passing from a token through a baffle is dependent not only on the pattern of radiation on the token but also on the configuration of the baffle. This net radiation therefore serves to uniquely identify each token.

Positioned behind each baffle 36, 38 is a respective radiation detection device 40 or 42, which devices are chosen to give equal indications in the presence of equal radiation. These devices can, for example, be Geiger-Muller tubes connected in the way well known to the art. The outputs from detectors 40, 42 are respectively fed to the amplifiers 44, 46 and from these to the voltage comparison network 50 which includes the four resistors 51 and 52 connected to a direct voltage source.

If the beams of radiation impinging on detectors 40, 42 are equal in intensity, the voltages on the leads 53, 54 of network 50 will be equal, if not, these voltages will not be equal. The voltages on these leads are alternately sampled by the switching relay 56, operating for example at 20 cycles per second, and applied by this relay to the grid of the high input impedance amplifier tube 58. The output from this tube is further amplified by the tube 60 and then fed to the two rectifiers 62 and 64. One rectifier is poled for current flow in one direction and the other rectifier poled for current flow in the opposite direction.

If the voltages applied to relay 56 from network 50 are equal, then no alternating output voltage is obtained from tube 60 and no currents flow in rectifiers 62, 64. On the other hand, if the voltages derived from bridge 50 are unequal, then currents will flow in these rectifiers. Voltages corresponding to these currents are amplified separately but in parallel by the push-pull stages 66 and 68 and applied to the push-pull output stage 70 including the tube 72 and the tube 74. Connected in the plate circuit of tube 72 is the relay 76 having the ganged switches 78 and 80, whose contacts are normally positioned as shown. A similar relay 82 is connected in the plate circuit of tube 74 and controls the ganged switches 84 and 86 normally positioned as shown.

Switches 80 and 86 are connected in series with each other and the leads 90, 92 which are adapted, for example, to apply a signal to the merchandise dispensing mechanism of a vending machine (not shown). Thus, a suitable time after a customer's token is placed before detector 40, if the switches 80 and 86 remain in the position shown, indicating an acceptable match between the customer's token and the standard one, the machine will automatically dispense the selected goods. Alternatively, if switch 80 is opened and switch 78 closed by a signal acting on relay 76, this resulting from a mis-match between the customer's and the standard tokens, then the reject mechanism of the vending machine will be operated by the leads 94 and 96. The positions of the switches for this "reject" action are shown in Figure 6. The customer's token will also be rejected if relay 82 is operated instead of relay 76 or if both relays are operated since switches 78 and 84 are connected in parallel across leads 94, 96.

In connection with the radiation detectors 40, 42 in Figure 5, these may be moved in unison by any suitable means, such as a motor, cyclically up and down relative to tokens 32, 34 to scan them as indicated by the arrows 100. If the rays of radiation reaching each detector match, then the output voltages on leads 52, 54 will remain matched. If there is an unmatched variation in these rays, then the voltages on leads 52, 54 will not stay balanced and the customer's token will be rejected. The types or values of circuit elements and voltage shown in Figure 5 can be as indicated.

Figure 7:
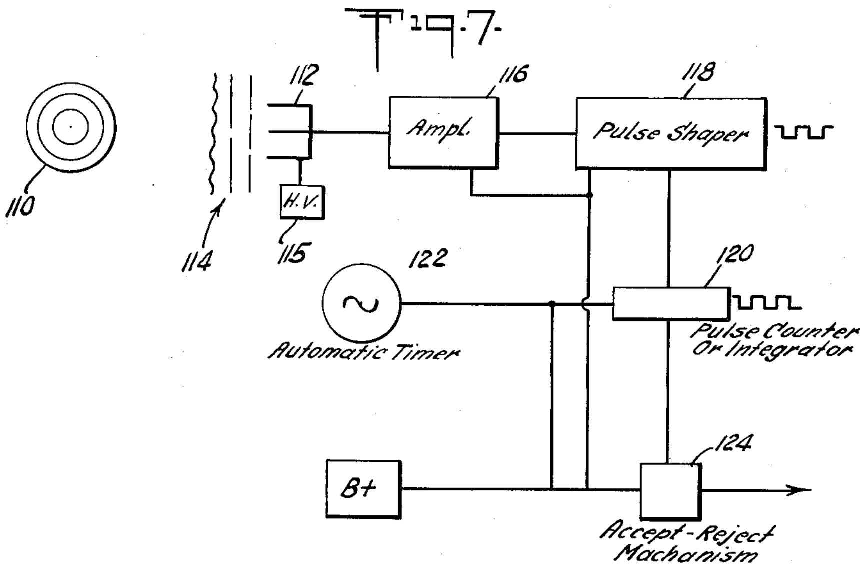
Figure 7 is another token testing circuit embodying features of the invention.

Figure 7 shows a simplified token testing system embodying features of the invention. A customer's token 110, like token 11, for example, is positioned in front of a G-M tube 112 which is screened by the baffles 114 and which is energized by a high voltage source 115. Selected components of the radiation emanating from token 110 impinge upon tube 112 and give rise to an output signal which is amplified in the amplifier 116 and then applied to the pulse shaping device 118 which can be a multivibrator well known to the art. Output pulses from this device, which pulses are uniform in size and synchronized with the pulses from G-M tube 112, are then counted in device 120 for a given interval determined by timer 122. The output signal from counter 120 is applied to the accept-reject mechanism 124 of a vending machine, mechanism 124 being set to accept the token and release merchandise only if the signal from counter 120 lies within narrow limits. As before baffles 114 can be changed periodically to insure that all genuine tokens previously sold to customers and now being used will be accepted even though the radio-activity of the tokens has appreciably changed in the meantime.

The above description of the invention is intended in illustration and not in limitation thereof. Various changes may occur to those skilled in the art and these may be made without departing from the spirit or scope of the invention as set forth.

We claim:

1. A token suitable for use in a coin-vending machine and the like, comprising a body of material having a plurality of distinct areas, each area containing a radioactive substance different from the substance in at least one other area.

2. The combination of elements as in claim 1 wherein said body is a flat circular disk and said areas are concentric annular zones.

3. The combination of elements as in claim 1 wherein said body has a shape by which it can be physically oriented and said areas are distributed in predetermined relation to said shape whereby said token will be able to automatically align said areas in front of a radiation detector so that they can be tested.

4. A token of the character described comprising a base member at least a portion of which carries two distinct radioactive materials each having its respective decay time different from that of the other radioactive material whereby the total radioactivity emitted by said token changes in accordance with a complex pattern which is difficult to copy.

References Cited in the file of this patent

UNITED STATES PATENTS

| | | |
|---|---|---|
| 632,938 | Greenburg | Sept. 12, 1899 |
| 2,264,725 | Shoupp et al. | Dec. 2, 1941 |
| 2,410,845 | Snell et al. | Nov. 12, 1946 |
| 2,531,236 | Snell et al. | Nov. 21, 1950 |
| 2,773,196 | Hall | Dec. 4, 1956 |
| 2,774,060 | Thompson | Dec. 11, 1956 |

FOREIGN PATENTS

| | | |
|---|---|---|
| 1,098,165 | France | Mar. 2, 1955 |